(12) United States Patent
Allen

(10) Patent No.: US 11,912,399 B2
(45) Date of Patent: Feb. 27, 2024

(54) COMPACT AIRCRAFT ACTUATOR SYSTEM

(71) Applicant: GOODRICH CORPORATION, Charlotte, NC (US)

(72) Inventor: Jason Bradley Allen, Waco, TX (US)

(73) Assignee: GOODRICH CORPORATION, Charlotte, NC (US)

( * ) Notice: Subject to any disclaimer, the term of this patent is extended or adjusted under 35 U.S.C. 154(b) by 126 days.

(21) Appl. No.: 17/675,789

(22) Filed: Feb. 18, 2022

(65) Prior Publication Data

US 2023/0264808 A1    Aug. 24, 2023

(51) Int. Cl.
*B64C 25/22*    (2006.01)
*F16H 19/00*    (2006.01)

(52) U.S. Cl.
CPC ........... *B64C 25/22* (2013.01); *F16H 19/005* (2013.01)

(58) Field of Classification Search
CPC ....... B64C 25/22; B64C 25/50; F16H 19/005; B62D 5/10; B62D 5/12; B62D 5/20
See application file for complete search history.

(56) References Cited

U.S. PATENT DOCUMENTS

| | | | |
|---|---|---|---|
| 2,856,138 A | 10/1958 | Hogan | |
| 3,444,784 A * | 5/1969 | Wengerd | F15B 15/065 91/533 |
| 6,289,788 B1 | 9/2001 | Holtom | |
| 8,312,784 B2 | 11/2012 | Bonny | |
| 9,908,621 B2 | 3/2018 | Didey | |
| 10,940,942 B2 | 3/2021 | Morris | |
| 11,066,154 B2 | 7/2021 | Morris | |
| 2015/0000433 A1* | 1/2015 | Farcy | F16J 1/16 74/30 |
| 2016/0272307 A1* | 9/2016 | Perkins | B64C 25/10 |
| 2016/0318604 A1* | 11/2016 | Guery | B64C 25/50 |

FOREIGN PATENT DOCUMENTS

| | | |
|---|---|---|
| EP | 0741073 | 3/2002 |
| FR | 2558554 | 7/1985 |

OTHER PUBLICATIONS

European Patent Office, European Search Report dated Jul. 3, 2023 in Application No. 23156745.4.

* cited by examiner

*Primary Examiner* — Richard G Davis
(74) *Attorney, Agent, or Firm* — SNELL & WILMER L.L.P.

(57) ABSTRACT

An aircraft actuation system is disclosed that includes a pair of cylinders, a piston movably disposed in each cylinder, and a roller train that extends between the pistons in the two cylinders. A portion of the roller train is disposed beyond the cylinders to engage a pinion. Movement of the pistons in the two cylinders in opposite directions produces a corresponding movement of the roller train to in turn rotate the pinion. The roller train may be maintained in compression between its two ends by fluid pressure exerted on a common face of each of the pistons in the two cylinders. The cylinders may be disposed in non-colinear relation, including in parallel relation to one another. A guide may be used to maintain rollers of the roller train in a proper orientation for entry into a space between an outer race and the pinion.

19 Claims, 12 Drawing Sheets

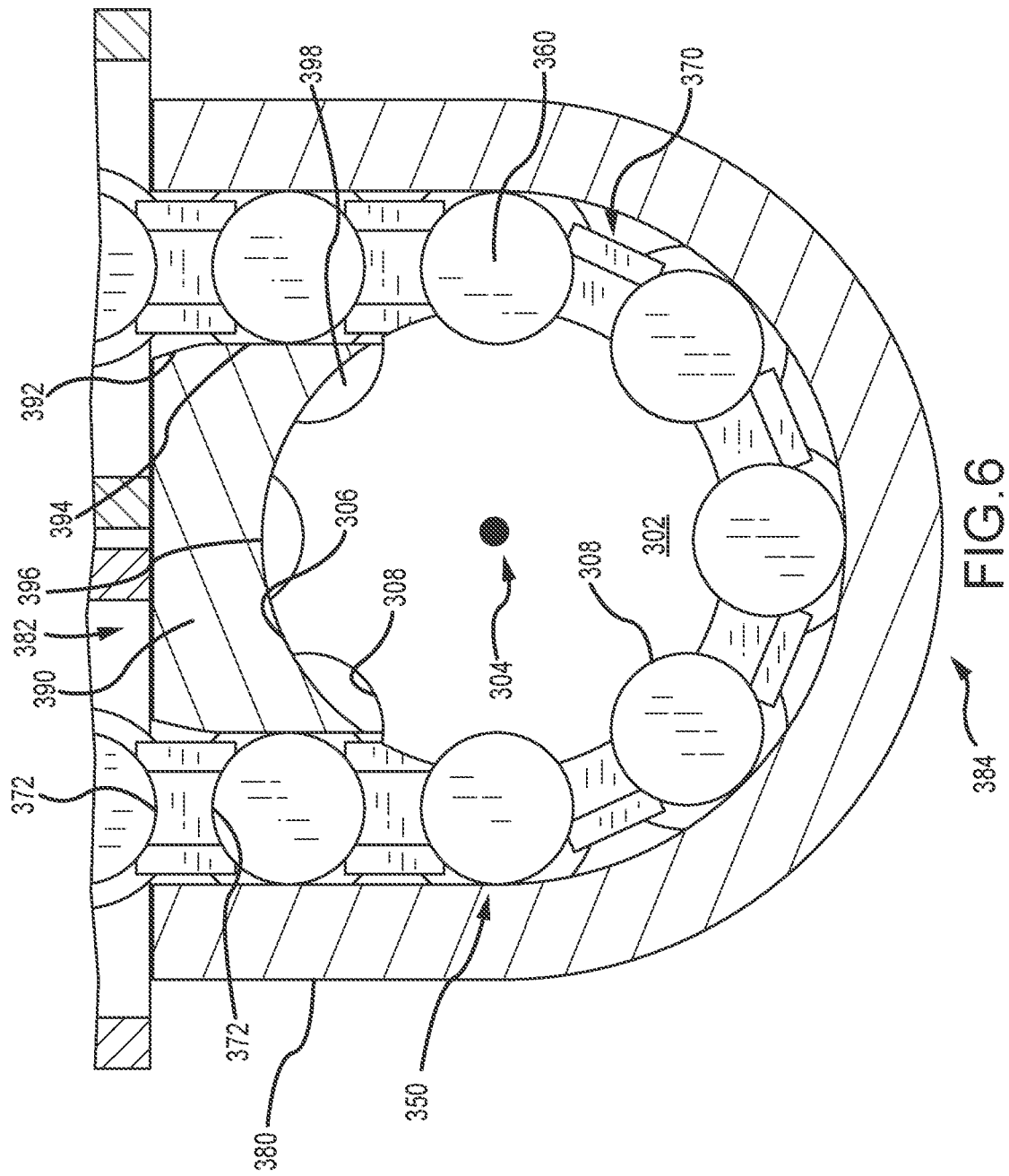

COMPACT AIRCRAFT ACTUATOR SYSTEM

FIELD

The present disclosure generally relates to the field of aircraft and, more particularly, to an aircraft actuation system having reduced space requirements.

BACKGROUND

Aircraft may utilize both nose landing gear, typically aftly-disposed port-side landing gear, and typically aftly-disposed starboard-side landing gear. The landing gear may support the aircraft when not flying, allowing the aircraft to taxi, takeoff, and land. The nose landing gear may also be used to steer the aircraft. Conventional linear rack & pinion actuators are relatively simple and cost effective, but they have a fairly long cylinder overall length, especially for steering applications that require steering angles in excess of approximately +/−60 degrees. Attempting to package such an actuator to fit within an available aircraft installation envelope may be extremely difficult.

SUMMARY

An aircraft actuation system is presented herein. Both the configuration of such an aircraft actuation system and the operation of such an aircraft actuation system are within the scope of this Summary. This aircraft actuation system may be used for any appropriate application, including to exert an actuation force to rotate aircraft nose landing gear (e.g., to steer an associated aircraft), to exert an actuation force to deploy aircraft landing gear, to exert an actuation force to retract aircraft landing gear, to exert an actuation force to open a door, to exert an actuation force to close a door, or the like.

One aspect is embodied by an aircraft actuation system that includes a pinion, a first cylinder, a first piston that is movably disposed within the first cylinder, a second cylinder, a second piston that is movably disposed within the second cylinder, and a transfer member (e.g., a roller train) that is interconnected with each of the first piston and the second piston. At least part of the transfer member is disposed out of each of the first and second cylinders and is engaged with the pinion. Movement of the first piston and the second piston within the first cylinder and the second cylinder, respectively, moves the transfer member to rotate the pinion. Rotation of the pinion may be used as an actuation force for an aircraft component. The first and second cylinders may be disposed in noncollinear relation with one another, including where the first and second cylinders are disposed in parallel relation to one another and occupy a common position in a length dimension for the aircraft actuation system.

Another aspect is embodied by a method of operating an aircraft actuation system that includes a first cylinder and a second cylinder. The first and second cylinders each have a first cylinder end and an oppositely disposed second cylinder end. A first flow may be directed into the first cylinder to move the first piston within the first cylinder toward its corresponding first cylinder end in response to this first flow. A roller train may be pushed in a first direction in response to this movement of the first piston by the first flow. This roller train extends between the first and second cylinders and engages a pinion of the aircraft actuation system. The piston within the second cylinder is moved toward its corresponding second cylinder end in response to the movement of the roller train in the first direction (e.g., the pistons within the first and second cylinders may be characterized as moving in opposite directions). The pinion is rotated in a first rotational direction using the movement of the roller train in the first direction. The roller train is compressed between the first piston and the second piston by using the first flow to push the first piston within the first cylinder and by pressurized fluid acting on the second piston within the second cylinder to oppose movement of the second piston toward its corresponding second cylinder end.

Various aspects of the present disclosure are also addressed by the following examples and in the noted combinations:

1. An aircraft actuation system comprising:
    a pinion;
    a first cylinder;
    a first piston movably disposed within said first cylinder;
    a second cylinder disposed in non-collinear relation with said first cylinder;
    a second piston movably disposed within said second cylinder;
    a transfer member interconnected with each of said first piston and said second piston, wherein at least part of said transfer member is disposed out of each of said first and second cylinders and is engaged with said pinion;
    wherein movement of said first piston and said second piston within said first cylinder and said second cylinder, respectively, moves said transfer member to rotate said pinion.

2. The aircraft actuation system of example 1, wherein said first cylinder is parallel with said second cylinder.

3. The aircraft actuation system of example 2, wherein a reference axis located between said first cylinder and said second cylinder defines a longitudinal dimension for said aircraft actuation system, wherein said first cylinder and said second cylinder are disposed at a common position in said longitudinal dimension.

4. The aircraft actuation system of example 1, wherein a reference axis located between said first cylinder and said second cylinder defines a longitudinal dimension for said aircraft actuation system, wherein at least one of said first cylinder and said second cylinder is disposed at an angle relative to said reference axis.

5. The aircraft actuation system of example 4, wherein an included angle between said first cylinder and said second cylinder is less than 180°.

6. The aircraft actuation system of any of examples 1-5, wherein said transfer member is retained in compression between said first piston and said second piston.

7. The aircraft actuation system of any of examples 1-6, wherein said transfer member comprises a roller train comprising a plurality of rollers disposed in spaced relation to one another.

8. The aircraft actuation system of any of examples 1-6, wherein said transfer member comprises a plurality of rollers and a plurality of shoes, wherein each roller of said plurality of rollers is disposed in spaced relation to every other said roller of said plurality of rollers, wherein each shoe of said plurality of shoes is disposed in spaced relation to every other said shoe of said plurality of shoes, and wherein a different single said shoe is disposed between each adjacent pair of said rollers of said plurality of rollers.

9. The aircraft actuation system of example 8, wherein each said roller of said plurality of rollers comprises a central body.

10. The aircraft actuation system of example 9, wherein said central body of each said roller of said plurality of rollers is engaged with an at least generally complementary-shaped curved surface of each said shoe that is engaged with said roller.

11. The aircraft actuation system of any of examples 9-10, wherein said central body of each said roller of said plurality of rollers is engageable with an at least generally complementary-shaped pocket on an outer perimeter of said pinion.

12. The aircraft actuation system of any of examples 9-11, wherein each said roller of said plurality of rollers comprises a pair of heads disposed at opposite ends of said central body, wherein each head of said pair of heads has a larger outer diameter than an outer diameter of its corresponding said central body.

13. The aircraft actuation system of example 12, wherein each said head of each said roller comprises a flat end surface and a curved transition surface defined by a radius that is slightly less than a radius of an inner surface of each of said first cylinder and said second cylinder.

14. The aircraft actuation system of example 13, wherein contact between each said head of each said roller of said plurality of rollers and said inner surface of each of said first cylinder and said second cylinder is limited to said curved transition surface.

15. The aircraft actuation system of any of examples 12-14, wherein said pair of heads of each said roller of said plurality of rollers constrains movement in a first dimension.

16. The aircraft actuation system of any of examples 1-15, further comprising:
an outer race extending from a first end of said first cylinder, around a portion of said pinion and spaced from said pinion, and to a first end of said second cylinder.

17. The aircraft actuation system of example 16, wherein said outer race is at least substantially U-shaped.

18. The aircraft actuation system of any of examples 16-17, further comprising:
a guide disposed at least generally at said first end of each of said first cylinder and said second cylinder, disposed within an open end of said outer race and spaced inwardly of said outer race, and disposed between said pinion and each of said first cylinder and said second cylinder.

19. The aircraft actuation system of example 18, wherein said guide maintains an orientation of each said roller of said plurality of rollers prior to entering a space between said outer race and said pinion.

20. An aircraft comprising landing gear and the aircraft actuation system of any of examples 1-19, wherein rotation of said pinion actuates said landing gear.

21. The aircraft of example 20, wherein said actuation of said landing gear comprises steering said landing gear.

22. The aircraft of example 20, wherein said actuation of said landing gear comprises moving said landing gear between deployed and retracted positions.

23. A method of operating an aircraft actuation system comprising a first cylinder and a second cylinder, wherein each of said first cylinder and said second cylinder has a first cylinder end and an oppositely disposed second cylinder end, said method comprising:
directing a first flow into said first cylinder;
moving a first piston within said first cylinder toward said first cylinder end of said first cylinder in response to said directing a first flow step;
pushing a roller train in a first direction in response to said moving a first piston step by said first flow, wherein said roller train extends between said first and second cylinders and is engaged with a pinion of said aircraft actuation system throughout said pushing a roller train in a first direction step;
moving a second piston within said second cylinder toward said second cylinder end of said second cylinder in response to said pushing a roller train in a first direction step and against a pressurized fluid within said second cylinder between said second piston and said second cylinder end of said second cylinder;
rotating said pinion in a first rotational direction using said pushing a roller train in a first direction step; and
compressing said roller train between said first piston and said second piston using each of said pushing a roller train in a first direction step and said pressurized fluid within second cylinder.

24. The method of example 23, wherein said compressing said roller train step comprises compressing a plurality of rollers and a plurality of shoes between said first piston and said second piston.

25. The method of example 24, wherein each roller of said plurality of rollers is disposed in spaced relation to every other said roller of said plurality of rollers, wherein each shoe of said plurality of shoes is disposed in spaced relation to every other said shoe of said plurality of shoes, and wherein a different single said shoe is disposed between each adjacent pair of said rollers of said plurality of rollers.

26. The method of example 25, wherein contact between a first roller of said plurality of rollers and each of a first shoe and a second shoe of said plurality of shoes is maintained by said compressing said roller train step.

27. The method of any of examples 23-27, wherein said roller train extends into each of said first cylinder and said second cylinder, said method further comprising:
precluding said roller train from buckling within said first cylinder; and
precluding said roller train from buckling within said second cylinder.

28. The method of any of examples 23-27, wherein said aircraft actuation system further comprises an outer race, said method further comprising:
precluding said roller train from buckling upon exiting said first cylinder through its said first cylinder end and prior to entering a space between said outer race and said pinion.

29. The method of example 28, further comprising:
precluding said roller train from buckling upon exiting said space between said outer race and said pinion and prior to entering said second cylinder through its said first cylinder end.

30. The method of any of examples 23-29, further comprising:
directing a second flow into said second cylinder;
moving said second piston within said second cylinder and toward said first cylinder end of said second cylinder in response to said directing a second flow step;
pushing said roller train in a second direction in response to said moving said second piston step by said second flow, wherein said roller train is engaged with said pinion throughout said pushing said roller train in a second direction step;
moving said first piston within said first cylinder toward said second cylinder end of said first cylinder in response to said pushing said roller train in a second direction step and against a pressurized fluid within said first cylinder between said first piston and said second cylinder end of said first cylinder;

rotating said pinion in a second rotational direction using said pushing said roller train in a second direction step; and compressing said roller train between said first piston and said second piston using each of said pushing said roller train in a second direction step and said pressurized fluid within first cylinder.

31. The method of example 30, further comprising:

providing a first actuation of an aircraft component in response to said rotating said pinion in a first rotational direction step; and providing a second actuation of said aircraft component in response to said rotating said pinion in a second rotational direction step, wherein a result of said first actuation is different than a result of from said second actuation.

32. The method of any of examples 23-29, further comprising:

providing a first actuation of an aircraft component in response to said rotating said pinion in a first rotational direction step.

BRIEF DESCRIPTION OF THE DRAWINGS

The subject matter of the present disclosure is particularly pointed out and distinctly claimed in the concluding portion of the specification. An understanding of the present disclosure may be further facilitated by referring to the following detailed description and claims in connection with the following drawings. While the drawings illustrate various embodiments employing the principles described herein, the drawings do not limit the scope of the claims. Reference to "in accordance with various embodiments" in this Brief Description of the Drawings also applies to the corresponding discussion in the Detailed Description.

FIG. 6 is an enlarged, cutaway view of a roller guide, pinion, and track used by the aircraft actuation system of FIG. 4A, in accordance with various embodiments;

DETAILED DESCRIPTION

Figure 1:
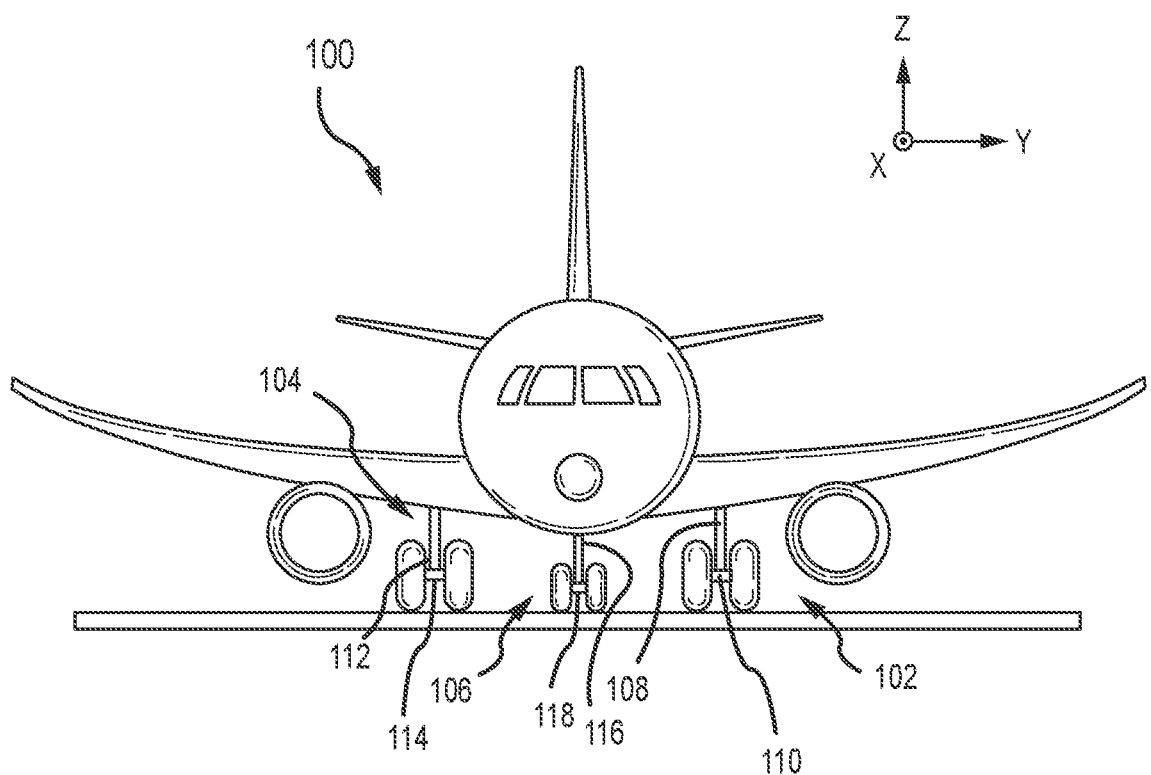
FIG. 1 illustrates an aircraft having a landing gear assembly and wheels mounted thereon, in accordance with various embodiments.

A representative aircraft 100 is illustrated in FIG. 1. In accordance with various embodiments, the aircraft 100 may include one or more landing gear systems, such as, for example, a left landing gear system 102 (or port-side landing gear system), a right landing gear system 104 (or starboard-side landing gear system) and a nose landing gear system 106. Each of the left landing gear system 102, the right landing gear system 104 and the nose landing gear system 106 may support the aircraft 100 when not flying, allowing the aircraft 100 to taxi, takeoff and land, safely and without damage to the aircraft. In various embodiments, the left landing gear system 102 may include a left landing gear assembly 108 that includes a left wheel assembly 110, the right landing gear system 104 may include a right landing gear assembly 112 that includes a right wheel assembly 114 and the nose landing gear system 106 may include a nose landing gear assembly 116 that includes a nose wheel assembly 118

Figure 2:
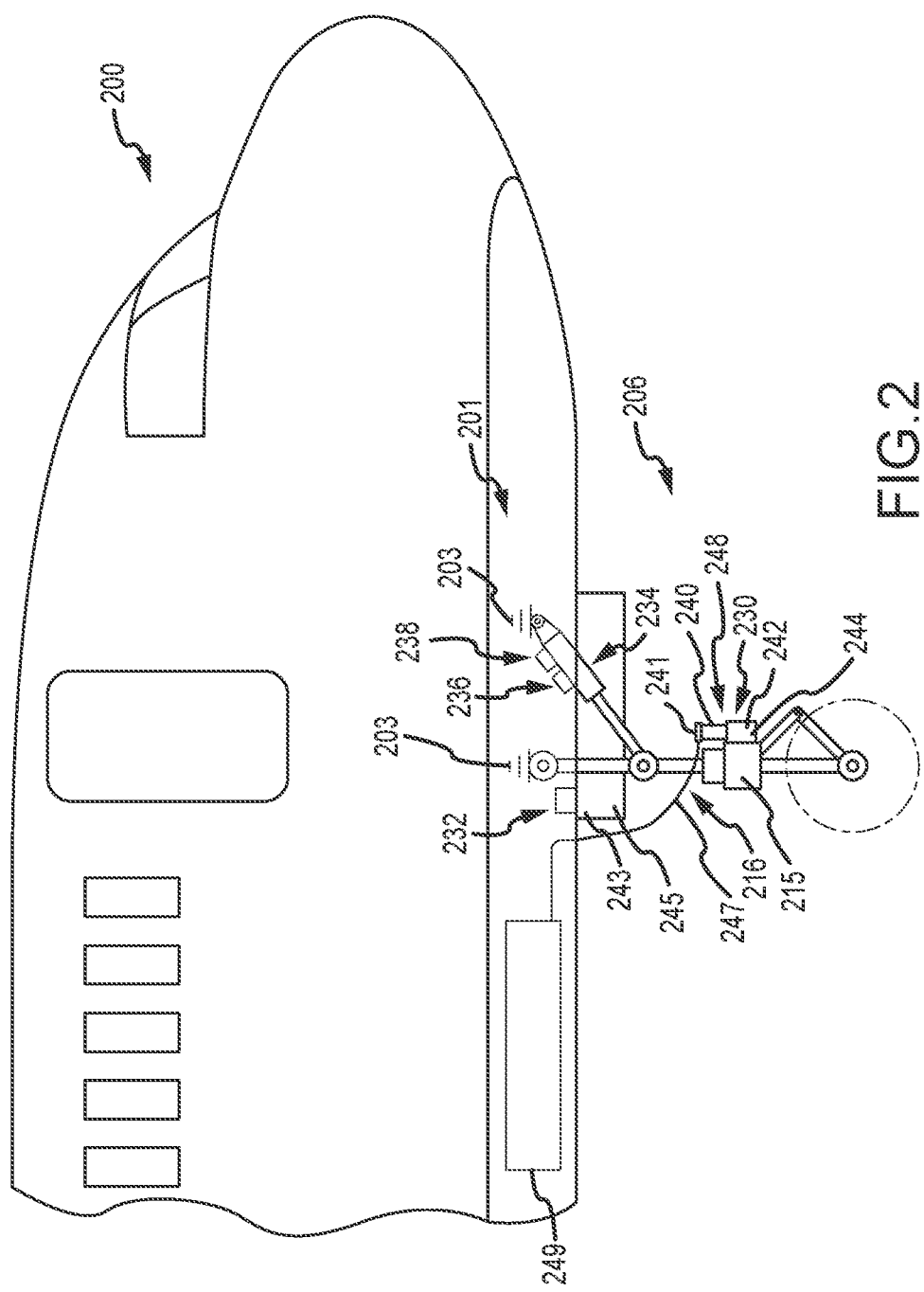
FIG. 2 illustrates mechanical components of an electro-hydraulic nose landing gear architecture, in accordance with various embodiments.

A representative aircraft 200 having a nose landing gear system 206 configured for retraction and stowage within an interior bay section 201 (or a nose landing gear bay) of the aircraft 200 is illustrated in FIG. 2, in accordance with various embodiments. The nose landing gear system 206 includes a steering actuator 230, a door actuator 232 and a retract actuator 234. The nose landing gear system 206 may further include a downlock actuator 236 and an uplock actuator 238 which, in various embodiments, may be located internal to the retract actuator 234 or external to the retract actuator 234 and connected to a fixed structure 203 within the interior bay section 201. The steering actuator 230 is connected to a steering collar 215 that is itself connected to a nose landing gear assembly 216 and configured to steer the nose landing gear system 206. The steering actuator 230 comprises an electric motor 240, a gear box 242 configured to transmit power provided by the electric motor 240 to the steering collar 215 and a clutch 244. In various embodiments, the combination of the electric motor 240, the gear box 242 and the clutch 244 comprises an electromechanical actuator 248 connected to the steering collar 215 and configured to steer the aircraft 200. In various embodiments, the steering actuator 230 may also include a hydraulic pump 241 operably coupled to the electric motor 240. A power cable 247 provides electrical power from a power source 249 to the electric motor 240. In various embodiments, the power source 249 is disposed locally within the interior bay section 201 or is provided by a centralized electrical power system external to the interior bay section 201.

The door actuator 232 of the aircraft 200 is connected to a door assembly 243 and configured to open and close a fairing door 245 of the door assembly 243 in order to provide access to the interior bay section 201 of the aircraft 200 for the nose landing gear system 206 to be stored when retracted. In various embodiments, the fairing door 245 may be slaved to the nose landing gear assembly 216 or to one or more other components of the nose landing gear system 206, obviating a need for the door actuator 232. The retract actuator 234 is connected to the nose landing gear assembly 216 and configured to raise and lower the nose landing gear assembly 216 into and out of, respectively, the interior bay section 201 of the aircraft 200.

Figure 3A:
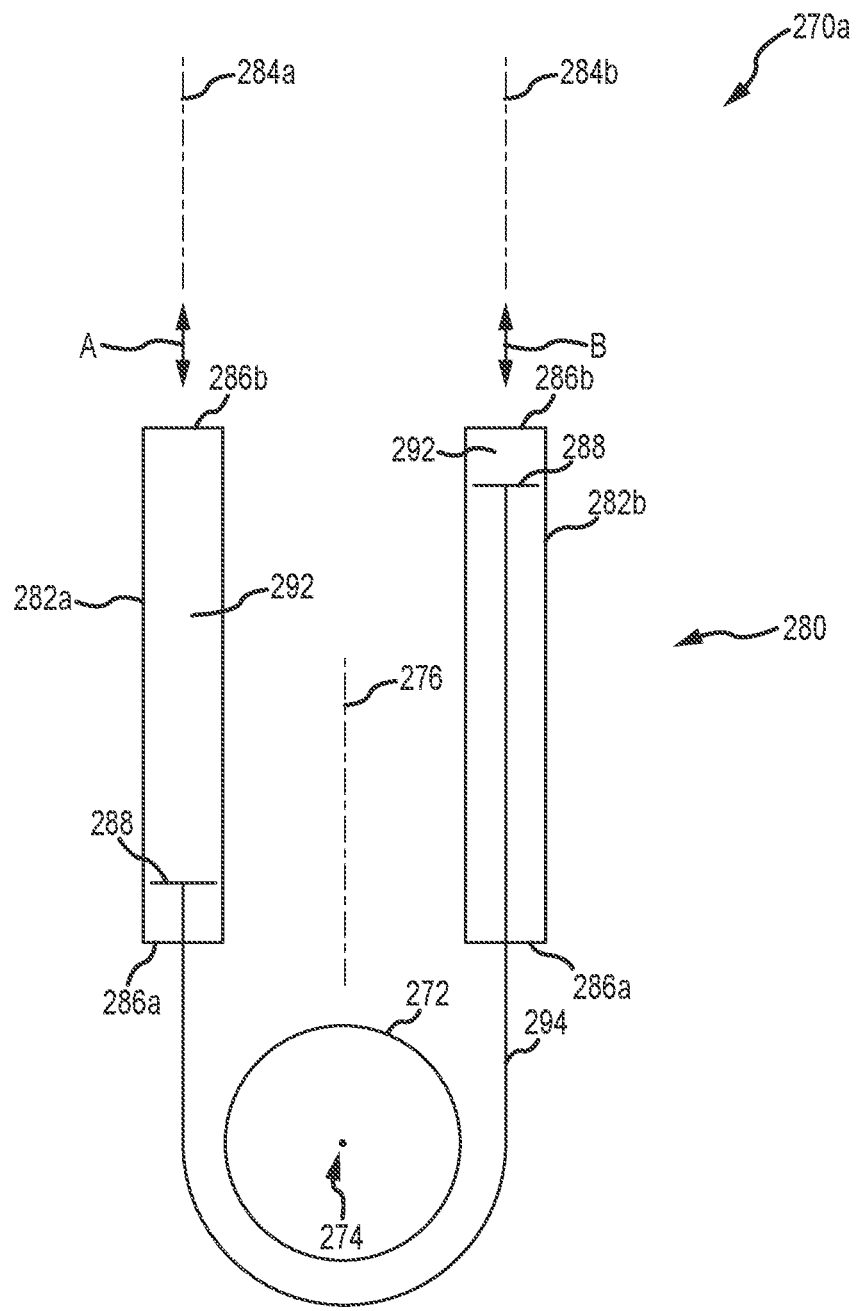
FIG. 3A is a schematic of an aircraft actuation system that utilizes a pair of cylinders disposed in parallel relation, in accordance with various embodiments.

An aircraft actuation system that may be used to steer aircraft nose landing gear (e.g., nose landing gear system 106 of FIG. 1; nose landing gear system 206 of FIG. 2), for instance by rotating a strut or strut assembly of such landing gear, is illustrated in FIG. 3A and is identified by reference numeral 270a. However, the aircraft actuation system 270a may also be used for other aircraft applications, such as opening/closing aircraft doors, actuation of aircraft landing gear (to deploy and retract aircraft landing gear), and the like.

The aircraft actuation system 270a includes a pinion 272 that is rotatable about an axis 274. This pinion 272 may be directly connected or indirectly interconnected (e.g., via one or more gears, belts, cables, and/or chains) with another aircraft component, such that rotation of the pinion 272 actuates this aircraft component. The aircraft actuation system 270a further includes what may be characterized as a pinion actuator 280—a combination of components for rotating the pinion 272 about its rotational axis 274. The pinion actuator 280 includes a pair of cylinders 282a, 282b that each have a piston 288 movably disposed therein. Each cylinder 282a, 282b has a corresponding cylinder longitudinal axis 284a, 284b, with these axes 284a, 284b being disposed in parallel relation to one another and furthermore in parallel relation to a reference axis 276 that extends through the rotational axis 274 of the pinion 272 and that is disposed between these longitudinal axes 284a, 284b. The reference axis 276 may be characterized as defining a length dimension of the aircraft actuation system 270a. In this regard, the cylinders 282a, 282b occupy the same position in this longitudinal dimension (e.g., their respective ends 286a are disposed in opposing relation, as are their respective ends 286b).

Each piston 288 may be moved toward a cylinder end 286a of its corresponding cylinder 282a, 282b, or toward a cylinder end 286b of its corresponding cylinder 282a, 282b. When the piston 288 in the cylinder 282a is moved toward its cylinder end 286a, the piston 288 in the other cylinder 282b is moved toward its cylinder end 286b. Similarly, when the piston 288 in the cylinder 282b is moved toward its cylinder end 286a, the piston 288 in the other cylinder 282a is moved toward its cylinder end 286b. As such, each piston 288 moves/reciprocates in its corresponding cylinder 282a, 282b in the direction indicated by the double-headed arrows A and B, respectively, in FIG. 3A (e.g., in alternating relation relative to the two different cylinders 282a, 282b).

What may be characterized as a transfer member 294 extends from the piston 288 in the cylinder 282a, to the pinion 272 where it engages a portion of an outer perimeter of the pinion 272, and to the piston 288 disposed in the other cylinder 284b. The transfer member 294 may be characterized as being part of the pinion actuator 280. Movement of the transfer member 294, by corresponding movement of the pistons 288 in the cylinders 282a, 282b, will rotate the pinion 272 about its rotational axis 274 via its engagement with the pinion 272. Any appropriate interface may be used between the transfer member 294 and the pinion 272, such that movement of the transfer member 294 by corresponding movements of the noted pistons 288 will rotate the pinion 272.

The aircraft actuation system 270a may be configured such that the transfer member 294 is maintained in compression between the two pistons 288 during operation of the aircraft actuation system 270a (e.g., in accord with the aircraft actuation system 300 that will be discussed in more detail below in relation to FIGS. 4A-8). For instance, hydraulic fluid (or more generally a flow) may be directed into a chamber 292 of the cylinder 282a to move its piston 288 in the direction of its cylinder end 286a, which through the transfer member 294 (via movement in what may be characterized as a first direction) may be used to move the piston 288 in the cylinder 282b in the direction of its cylinder end 286b and to rotate the pinion 272 about its rotational axis 274 in a first rotational direction. This movement of the piston 288 in the cylinder 282b in the direction of its cylinder end 286b may be resisted by maintaining at least a certain pressure within a chamber 292 of the cylinder 282b (via pressurized fluid, for instance fluid at a pressure within a range of 50-100 psi). The chamber 292 of each cylinder 282a, 282b is between its corresponding piston 288 and its corresponding cylinder end 286b. Conversely, hydraulic fluid may be directed into the chamber 292 of the cylinder 282b to move its piston 288 in the direction of its cylinder end 286a, which through the transfer member 294 (via movement in what may be characterized as a second direction that is opposite the above-noted first direction) may be used to move the piston 288 in the cylinder 282a in the direction of its cylinder end 286b and to rotate the pinion 272 about its rotational axis 274 in a second rotational direction (opposite to the above-noted first rotational direction). This movement of the piston 288 in the cylinder 282a in the direction of its cylinder end 286b may be resisted by maintaining at least a certain pressure within the chamber 292 of the cylinder 282a (via pressurized fluid, for instance fluid at a pressure within a range of 50-100 psi).

The above-described pinion actuator 280 may be characterized as a "U-shaped rack" for rotating the pinion 272. This U-shaped rack is collectively defined by the above-noted cylinders 282a, 282b, along with the transfer member 294 that extends between the pistons 288 in each of these cylinders 282a, 282b and about a portion of the outer perimeter of the pinion 272. This U-shaped configuration reduces space requirements for the aircraft actuation system 270a, which may be beneficial in one or more instances.

Figure 3B:
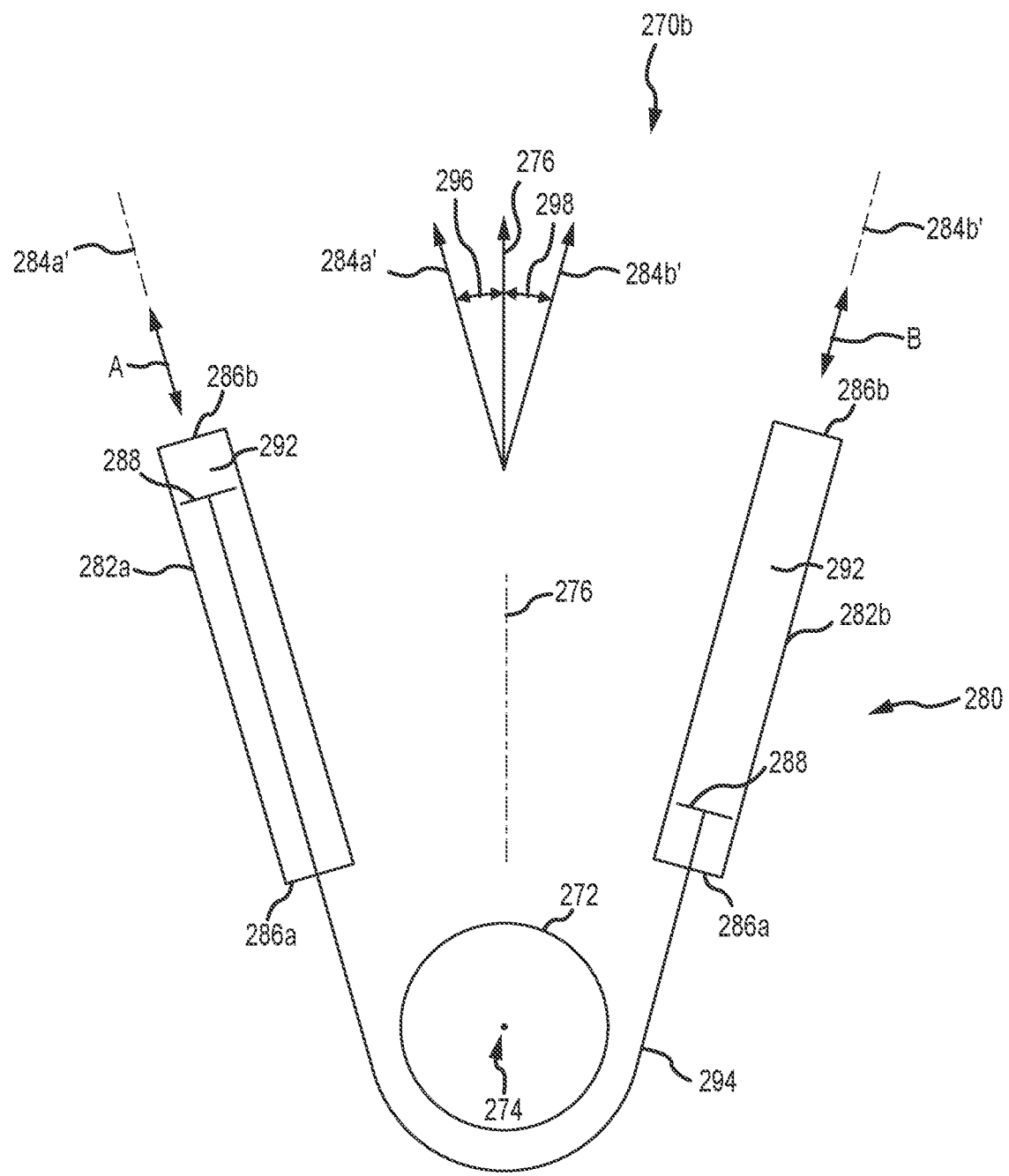
FIG. 3B is a schematic of an aircraft actuation system that utilizes a pair of cylinders disposed in non-parallel relation, in accordance with various embodiments.

A variation of the aircraft actuation system 270a of FIG. 3A is presented in FIG. 3B and is identified by reference numeral 270b. Corresponding components between the aircraft actuation system 270a (FIG. 3A) and the aircraft actuation system 270b (FIG. 3B) are identified by the same reference numerals, and unless otherwise noted to the contrary herein the foregoing description remains equally applicable to these corresponding components of the aircraft actuation system 270b of FIG. 3B. The primary difference between the aircraft actuation system 270a of FIG. 3A and the aircraft actuation system 270b of FIG. 3B is the orientation of the cylinders 282a, 282b in that the cylinders 282a, 282b are disposed in non-parallel relation to one another. The cylinder longitudinal axis 284a' of the cylinder 282a is disposed at an angle 296 relative to the reference axis 276 that again extends through the rotational axis 274 of the pinion 272, that is disposed between the cylinders 282a, 282b, and that defines a length dimension of the aircraft actuation system 270b. The cylinder longitudinal axis 284b' of the cylinder 282b is disposed at an angle 298 relative to the reference axis 276. Each of the angles 296, 298 may be 0° or greater and may be up to 90°, although the sum of the angles 296, 298 should be less than 180°. Although the orientation of the cylinder 282a may be the mirror image of the cylinder 284b relative to the reference axis 276 (e.g., the magnitudes of the angles 296, 298 may be of equal values), such need not the case (e.g., the magnitudes of the angles 296, 298 may be different values). One of the cylinders 282a could be parallel with the reference axis 276, and the other of the cylinders 282a, 282b could be disposed at a 90° angle relative to the reference axis 276.

An aircraft actuation system (including individual components thereof) that may be used to steer aircraft nose landing gear (e.g., nose landing gear system 106 of FIG. 1; nose landing gear system 206 of FIG. 2), for instance by rotating a strut or strut assembly of such landing gear, is illustrated in FIGS. 4A-7B and is identified by reference numeral 300. However, the aircraft actuation system 300 may also be used for other aircraft applications, such as opening/closing aircraft doors, actuation of aircraft landing gear (to deploy and retract aircraft landing gear), and the like. Although the configuration of the aircraft actuation system 300 is illustrated as being at least generally in accord with the aircraft actuation system 270a of FIG. 3A, the aircraft actuation system 300 may also be modified to be in accord with the aircraft actuation system 270b of FIG. 3B. With regard to a steering application for aircraft nose landing gear, it should be appreciated that the electromechanical nose wheel steering actuator described above with regard to FIG. 2 would be replaced by a hydro-mechanical actuator, for instance in accord with the aircraft actuation system 300 (converting hydraulic power to mechanical power with or without a gearbox at its output), which may (in various embodiments) be driven by a centralized hydraulic system, a local electric motor-driven pump (powerpack) system, or an electric motor-driven pump integrated directly into the steering actuator.

Figure 4A:
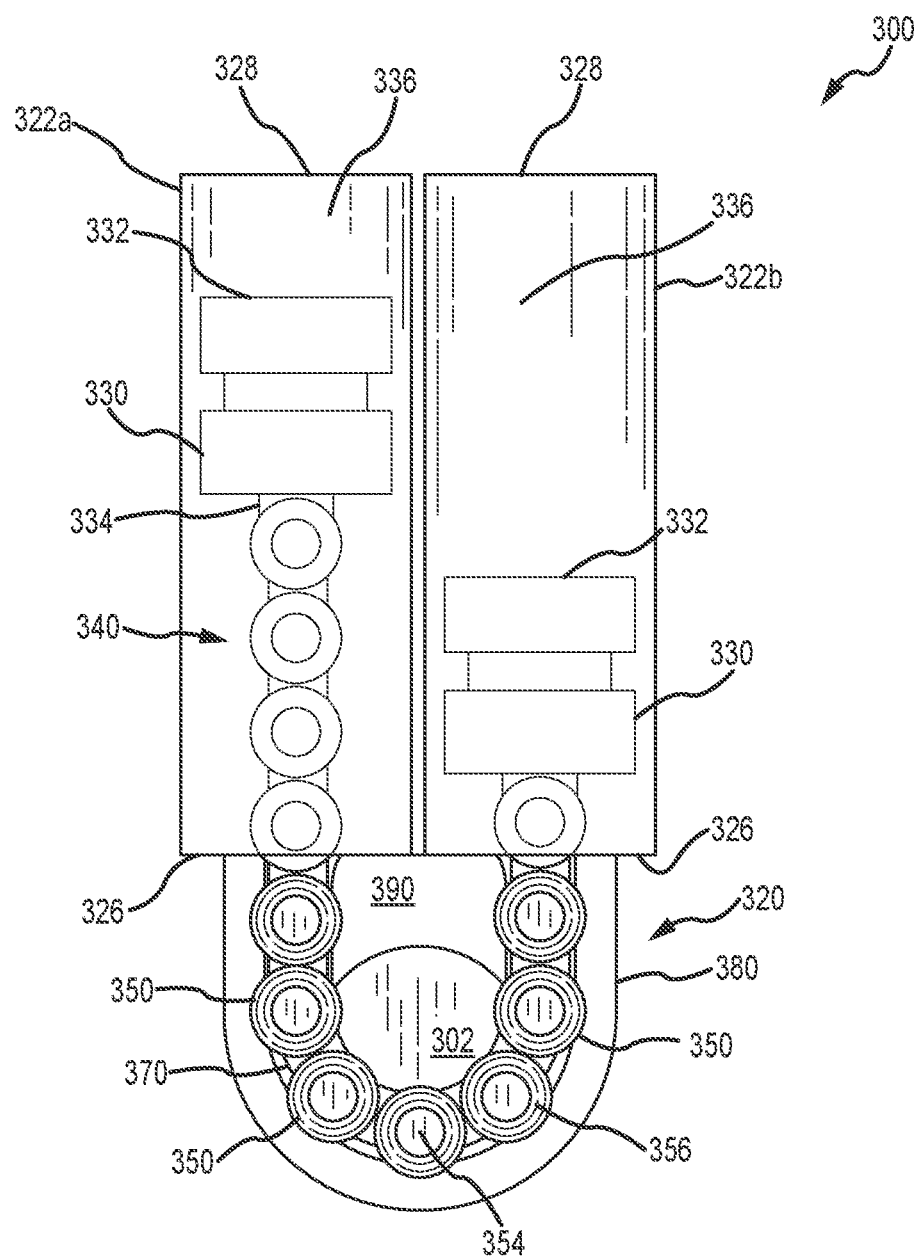
FIG. 4A illustrates an aircraft actuation system that utilizes a roller train that extends between a pair of cylinders to rotate a pinion, in accordance with various embodiments.
Figure 4B:
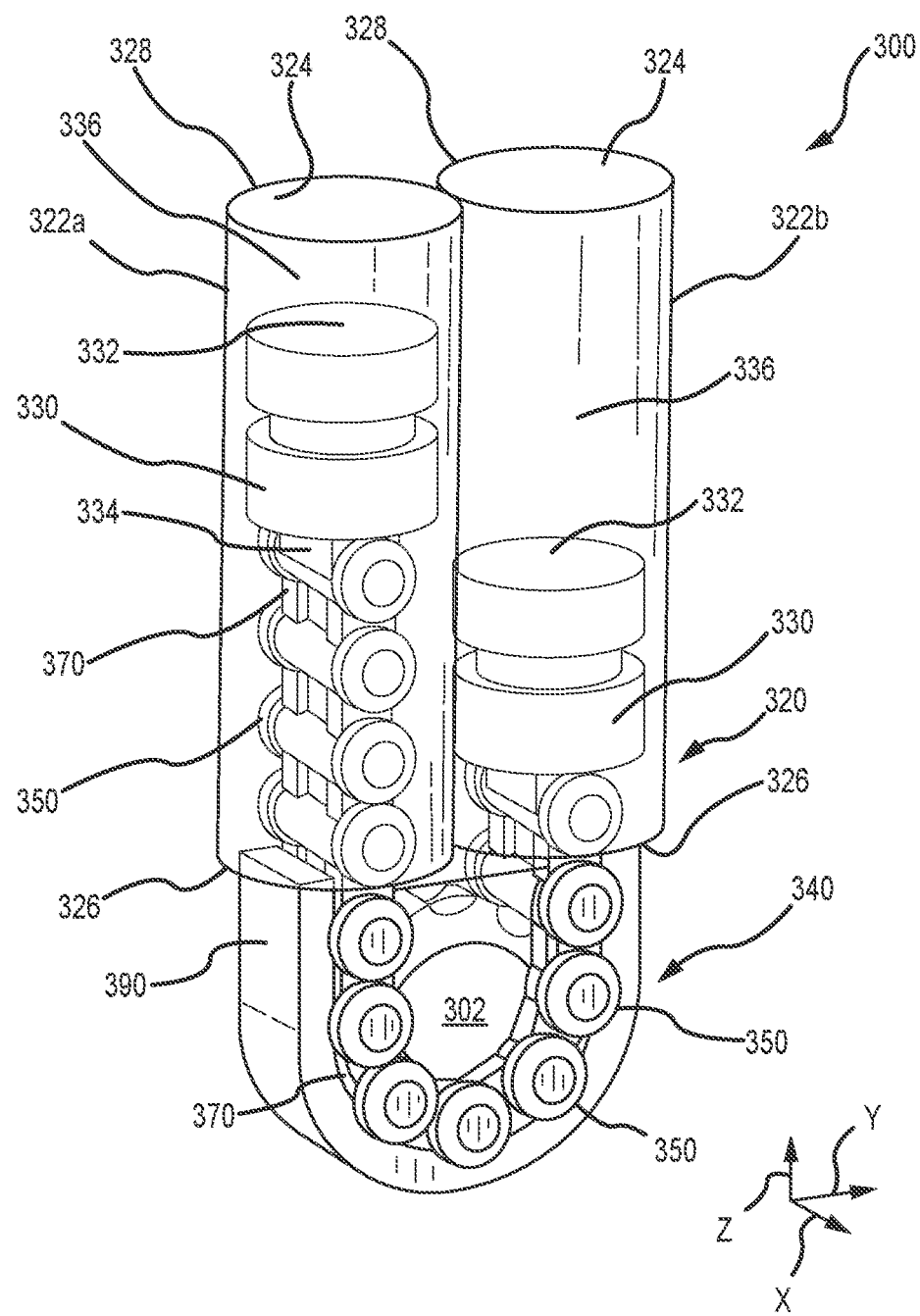
FIG. 4B is a perspective view of the aircraft actuation system of FIG. 4A, in accordance with various embodiments.

As shown in FIGS. 4A and 4B, the aircraft actuation system 300 includes a pinion 302 that is rotatable about an axis 304. This pinion 302 may be directly connected or indirectly interconnected (e.g., via one or more gears, belts, cables, and/or chains) with another aircraft component, such that rotation of the pinion 302 actuates this aircraft component. In any case, the pinion 302 (as shown in greater detail in FIG. 6) includes an outer perimeter 306 having a plurality of pockets or recesses 308 that are spaced about the rotational axis 304 (e.g., in equally-spaced relation).

The aircraft actuation system 300 further includes what may be characterized as a pinion actuator 320—a combination of components for rotating the pinion 302 about its rotational axis 304. The pinion actuator 320 includes a pair of cylinders 322a, 322b (presented in transparency in FIGS. 4A-4B) that each have a piston 330 movably disposed therein and that each includes an inner cylindrical surface 324. The cylinders 322a, 322b are disposed in parallel relation to one another. Each piston 330 may be moved toward a cylinder end 326 of its corresponding cylinder 322a, 322b, or toward a cylinder end 328 of its corresponding cylinder 322a, 322b. In response to the piston 330 in the cylinder 322a being moved toward its cylinder end 326 in a manner that will be discussed in more detail below, the piston 330 in the other cylinder 322b moves toward its cylinder end 328. Similarly, in response to the piston 330 in the cylinder 322b moving toward its cylinder end 326, the piston 330 in the other cylinder 322a is moved toward its cylinder end 328. As such, each piston 330 moves/reciprocates in its corresponding cylinder 322a, 322b along an axial path (including in alternating relation).

A chamber 336 is defined in each cylinder 322a, 322b between a face 332 of its corresponding piston 330 and its corresponding cylinder end 328. A roller interface 334 is incorporated by each piston 330 and is disposed opposite its corresponding piston face 332 (e.g., the roller interface 334 and the piston face 332 of each piston 330 are spaced along a length dimension of its corresponding cylinder 332a, 332b).

The aircraft actuation system 300 includes a transfer member (to engage/rotate the pinion 302) in the form of a roller train 340. The roller train 340 may be characterized as being part of the pinion actuator 320. The roller train 340 includes a plurality of rollers 350 that are spaced along a length dimension of the roller train 340, with a single spacer or shoe 370 being disposed between each adjacent pair of rollers 350. A roller 350 at one end of the roller train 340 is engaged by the roller interface 334 of the piston 330 in the cylinder 322a, while a roller 350 at the opposite end of the roller train 340 is engaged by the roller interface 334 of the piston 330 and the other cylinder 322b. As will be discussed in more detail below, the roller train 340 is maintained in compression between the pistons 330 within the cylinders 322a, 322b.

Each roller 350 includes a pair of heads 352 that are spaced along a length dimension of the corresponding roller 350. A central body 360 extends between the pair of heads 352 of each roller 350. The outer perimeter of the central body 360 may be cylindrical, and may have a smaller outer diameter than an outer diameter of heads 352. In any case, the above-noted roller interface 334 of each piston 330 may be correspondingly-shaped with the central body 360 of the roller 350 at the corresponding end of the roller train 340 (the roller interface 334 of each piton 330 may engage the central body 360 of the roller 350 at the corresponding end of the roller train 340).

Figure 5:
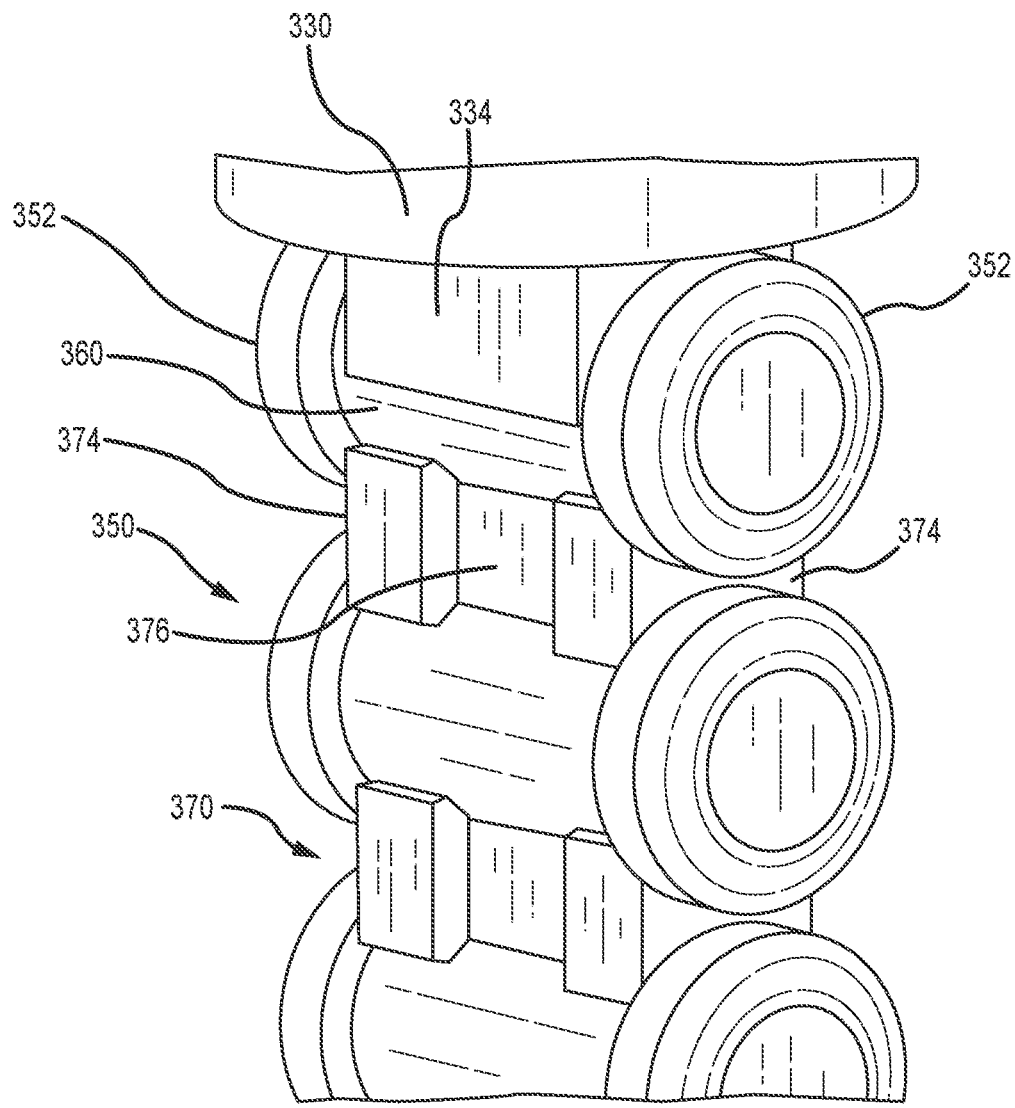
FIG. 5 is an enlarged, perspective view of a portion of the roller train used by the aircraft actuation system of FIG. 4A, in accordance with various embodiments.
Figure 5A:
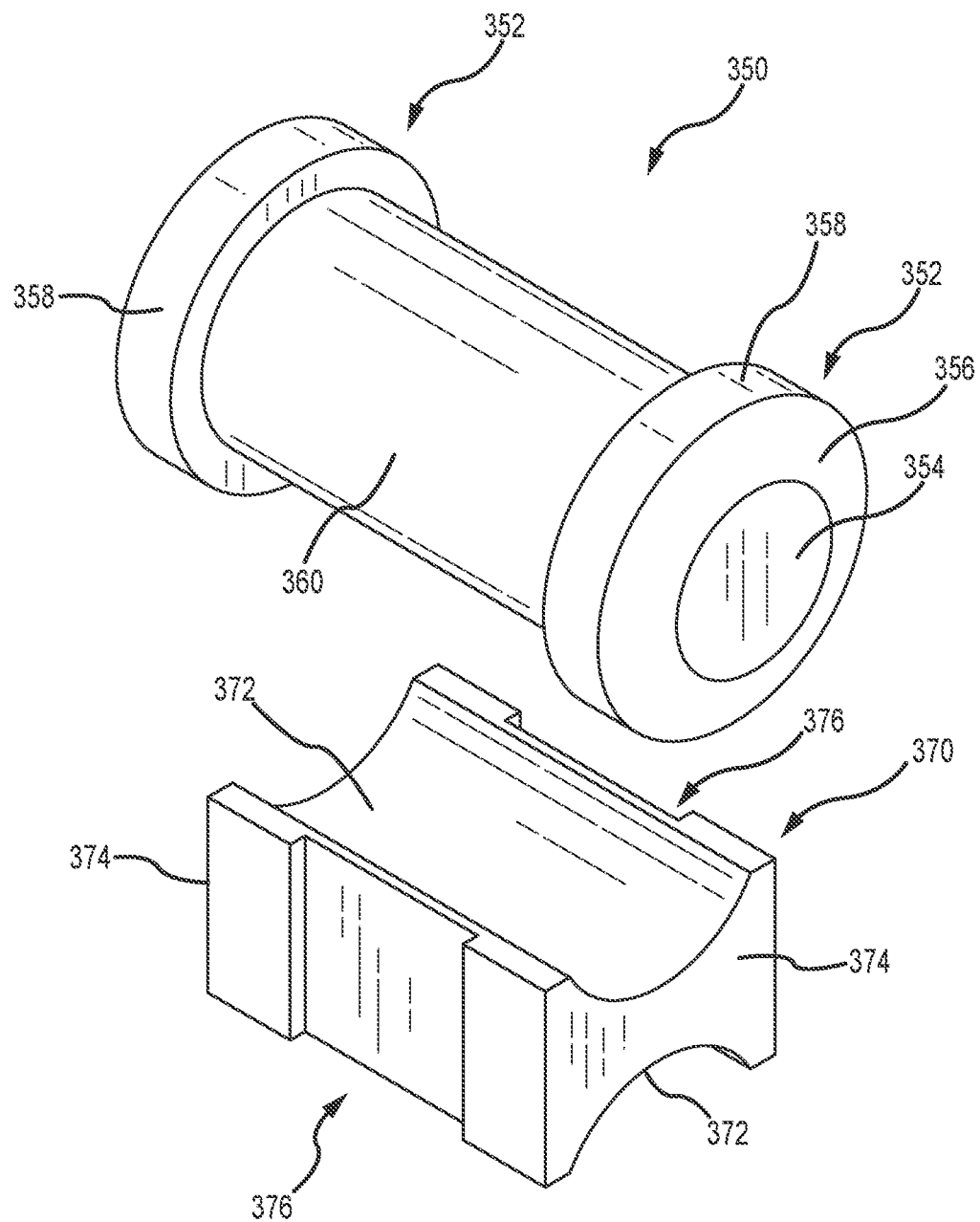
FIG. 5A is an exploded, perspective view of a portion of the roller train used by the aircraft actuation system of FIG. 4A, in accordance with various embodiments.
Figure 7A:
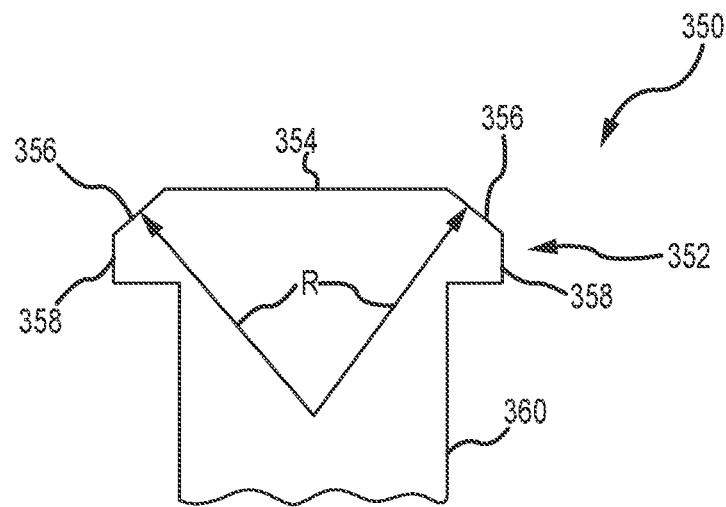
FIG. 7A is an enlarged view of one of the heads of one of the rollers used by the roller train for the aircraft actuation system of FIG. 4A, in accordance with various embodiments.
Figure 7B:
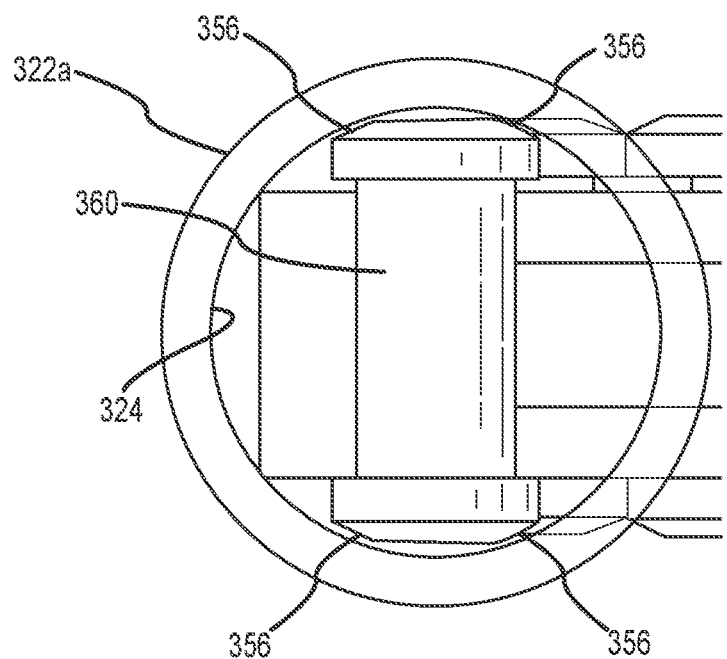
FIG. 7B is an enlarged view of the interface between one of the rollers used by the roller train for the aircraft actuation system of FIG. 4A and its corresponding cylinder, in accordance with various embodiments.

As shown in FIG. 5A, the head 352 of each roller 350 includes an end surface 354 (e.g., flat and oriented perpendicular to the length dimension of the corresponding roller 350), a transition surface 356 that is curved, and a perimeter surface 358 (e.g., cylindrical). As shown in FIG. 7A, the transition surface 356 is curved proceeding from the end surface 354 to the perimeter surface 358, and is defined by a radius R that is slightly less than a radius of the inner surface 324 of its corresponding cylinder 322a, 322b. Oppositely-disposed portions of the transition surface 356 of each roller 350 (e.g., FIG. 7B) may be disposed in interfacing or closely-spaced relation with the inner surface 324 of its corresponding cylinder 322a, 322b. In any case, the complementary-like shapes of the transition surface 356 of each roller 350 and the inner surface 324 of its corresponding cylinder 322a, 322b reduces the potential for misalignment of the rollers 350 within the corresponding cylinder 322a, 322b. The heads 352 of the rollers 350 (or at least for the transition surface 356) may be coated to reduce the potential for scratching the inner surfaces 324 of the cylinders 322a, 322b. The heads 352 of the rollers 350 also could be formed from Al—Ni bronze or another similar bearing material to reduce the potential for scratching the inner surfaces 324 of the cylinders 322a, 322b.

With continued reference to FIGS. 5 and 5A, a shoe 370 is again disposed between each adjacent pair of rollers 350 of the roller train 340. Each shoe 370 includes a pair of curved surfaces 372 that are oppositely disposed (e.g., FIG. 6). Each curved surface 372 may be defined by a radius that is at least substantially equal to a radius that defines the central body 360 of each roller 350. The radius defining the curved surfaces 372 of the shoes 370 may be slightly larger than the radius defining the central body 360 of the rollers 350. The curved surfaces 372 of the shoes and the outer perimeter of the central body 360 of the rollers 350 may be at least generally complementary-shaped.

The noted curved surfaces 372 are located between a pair of oppositely disposed ends 374 of the shoes 370 (e.g., FIGS. 5 and 5A). A recess or slot 376 is disposed between the ends 374 on at least one side of each shoe 370 (e.g., at least one a side of the shoe 370 that faces or projects toward the pinion 302). The slots 376 provide clearance for the pinion 302 during operation of the aircraft actuation system 300. It should be noted that the 376 slot in each shoe 370 may actually be cut deeper into the sides of the corresponding shoe 370 than as shown in one or more of the figures. Having the shoe slot 376 of at least a certain depth leaves clearance for the pinion 302 while preserving as much bearing area (shoe width) as practical for the remaining shoe length.

With reference to FIG. 6, the aircraft actuation system 300 further includes a track or outer race 380 that is disposed beyond the outer perimeter 306 of the pinion 302 (e.g., radially outwardly of the outer perimeter 306, relative to the rotational axis 304 of the pinion 302). The outer race 380 may be at least generally U-shaped and includes an open end 382 that projects or faces in a direction that is away from the pinion 302, along with an oppositely disposed closed end 384. A guide 390 is disposed within the outer race 380. This guide 390 is disposed at the open end 382 of the outer race 380 to facilitate retention of the rollers 350 in proper position/alignment for entry into the space between the pinion 302 and the outer race 380.

The guide 390 includes a chamfer or first wall 392 on each of its sides to facilitate entry of the rollers 350 into the space between the guide 390 and the outer race 380. The first walls 392 are each disposed in non-parallel relation to the corresponding portion of the outer race 380. The spacing between each first wall 392 and its corresponding portion of the outer race 380 is progressively reduced proceeding in the direction of the closed end 384 of the outer race 380. Each of the two sides of the guide 390 further includes a second wall 394 that is at least substantially parallel with its corresponding portion of the outer race 380. As such, each first wall 392 and its corresponding second wall 394 on each side of the guide 390 are disposed in different orientations.

The guide 390 further includes a curved wall 396 that is disposed radially outwardly of the outer perimeter 306 of the pinion 302. A recessed portion 398 of the guide 390 extends under the pinion 302 toward, but not to the rotational axis 304 of the pinion 302.

The roller train 340 is maintained in compression during operation of the aircraft actuation system 300. Hydraulic fluid (or more generally a flow) may be directed into the cylinder 322a to exert a force on the piston face 332 of its piston 330 to move this piston 330 in the direction of the corresponding cylinder end 326. The opposing heads 352 of the rollers 350, and the manner in which these heads 352 engage the inner surface 324 of the corresponding cylinder 322a, 322b, keeps the roller train 340 from buckling within the cylinders 322a, 322b. Rollers 350 exiting the cylinder 322a during the above-noted movement of the piston 330 in the cylinder 322a may be directed into the space between the pinion 302 and the outer race 380 by the guide 390, particularly the corresponding "leading" first wall 392 of the guide 390. The guide 390 keeps the roller train 340 from buckling from the time a given roller 350 exits the cylinder 322a during the above-noted movement of the piston 330 within the cylinder 322a and until this roller 350 is positioned within a pocket 308 on the outer perimeter 306 of the pinion 302. When a roller 350 is positioned within a complementary-shaped pocket 308 on the outer perimeter 306 of the pinion 302, this roller 350 will be retained between the pinion 302 and the outer race 380, and furthermore its opposing heads 352 may be disposed on/positioned beyond corresponding surfaces of the outer race 380 and pinion 302 (e.g., the heads 352 of each roller 350 constrain movement of the rollers in the noted "x" dimension when outside the cylinders 322a, 322b).

With reference to FIGS. 4A and 4B, the rollers 350 are spaced along the length of the roller train 340 such that rollers 350 will be sequentially disposed in pockets 308 on the outer perimeter 306 of the pinion 302 (FIG. 6) by the above-noted movement of the piston 330 within the cylinder 322a toward its cylinder end 326, which will then rotate the pinion 302 in a first rotational direction about its rotational axis 304. The noted movement of the piston 330 in the cylinder 322a will move the piston 330 in the other cylinder 322b in the direction of its cylinder end 328 (via the opposite end of the roller train 340 pushing piston 330 in the cylinder 322b toward its cylinder end 328. Rollers 350 exiting the space between the pinion 302 and the outer race 380 are directed into the cylinder 322b by the guide 390. Movement of the piston 330 in the cylinder 322b in the direction of its cylinder end 328 again may be resisted by maintaining at least a certain pressure within the chamber 336 of the cylinder 322b (e.g., via pressurized fluid, for instance fluid at a pressure within a range of 50-100 psi).

Operation of the aircraft actuation system 300 may be reversed to rotate the pinion 302 in a second rotational direction that is opposite to that described above. Summarily, hydraulic fluid (or more generally a flow) may be directed into the cylinder 322b to exert a force on the piston face 332 of its piston 330 to move this piston 330 in the direction of the corresponding cylinder end 326. This movement of the piston 330 within the cylinder 322b will produce a corresponding movement of the piston 330 in the other cylinder 322a that is in the direction of its cylinder end 328 (and that will in turn rotate the pinion 302 about its rotational axis 304 in the opposite second rotational direction to that described above). Movement of the piston 330 in the cylinder 322a in the direction of its cylinder end 328 again may be resisted by maintaining at least a certain pressure within the chamber 336 of the cylinder 322a (e.g., via pressurized fluid, for instance fluid at a pressure within a range of 50-100 psi).

The roller train 340 includes only the rollers 350 and the shoes 370. The rollers 350 and shoes 370 are individual components and are not mounted or attached to one another. Only external forces are applied to the roller train 340 to maintain the roller train 340 in its assembled. These external forces include the compression of the roller train 340 between the pistons 330 during operation of the aircraft actuation system 300 in accordance with the foregoing. Additional external forces that may be applied to the roller train 340 include one or more of the following: 1) contact between the curved transition surface 356 of a given roller 350 and the inner surface 324 of the corresponding cylinder 322a, 322b to keep the roller train 340 from buckling with the corresponding cylinder 322a, 322b; 2) contact between a given roller 350 and the outer race 380 and/or the guide 390 after the roller exits the corresponding cylinder 322a, 322b and prior to the time this roller is disposed between the outer race 380 and the pinion 302; and 3) contact between a given roller 350 and the outer race 380 and/or the pinion 302 when this roller 350 is disposed in the space between the outer race 380 and the pinion 302.

In the case where the aircraft actuation system 300 is used in conjunction with nose landing gear, movement of the pinion 302 in the noted first rotational direction may be used to turn the aircraft in one direction, while movement of the pinion 302 in the noted second rotational direction may be used to turn the aircraft in an opposite direction. In the case where the aircraft actuation system 300 is used in conjunction with aircraft landing gear, movement of the pinion 302 in the noted first rotational direction may be used deploy the aircraft landing gear, while movement of the pinion 302 in the noted second rotational direction may be used to retract the aircraft landing gear. In the case where the aircraft actuation system 300 is used in conjunction with an aircraft door, movement of the pinion 302 in the noted first rotational direction may be used open the aircraft door, while movement of the pinion 302 in the noted second rotational direction may be used to close the aircraft door.

Figure 8:
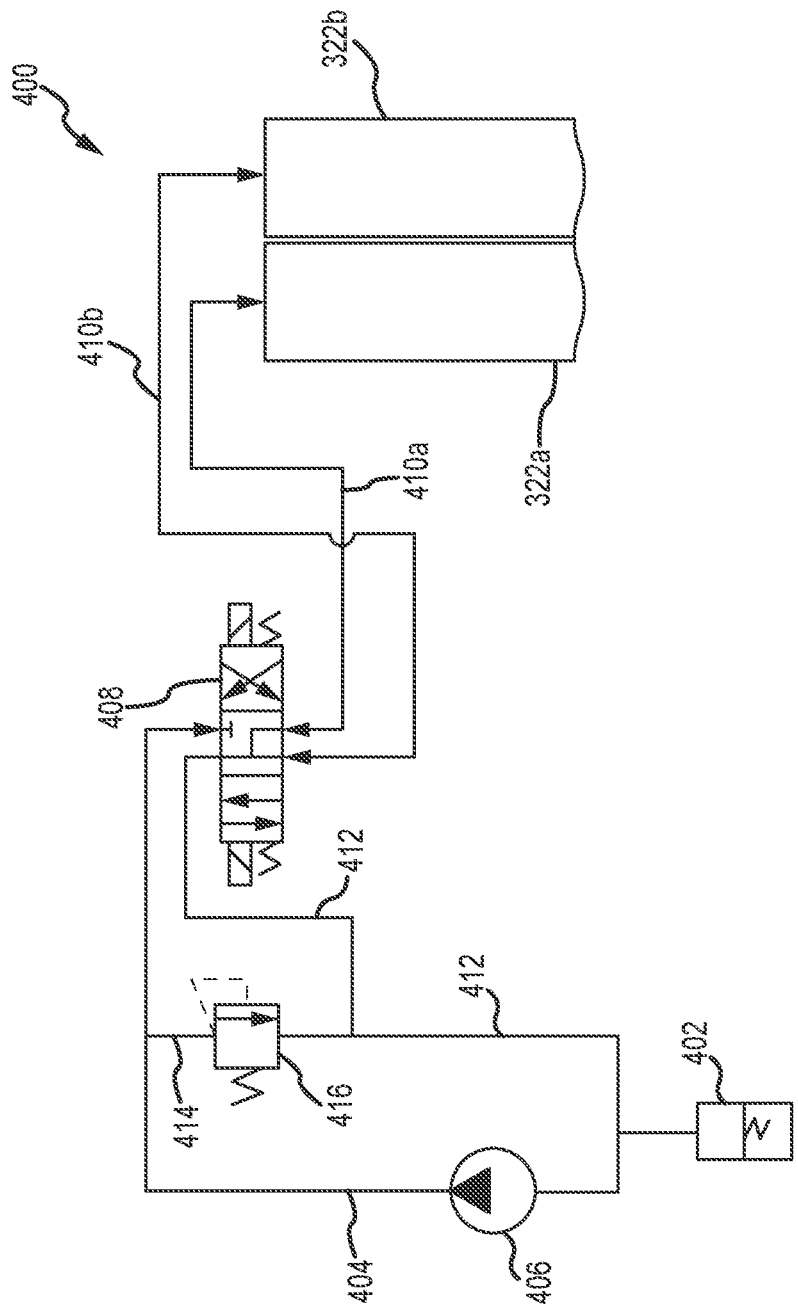
FIG. 8 is a schematic of a hydraulic system that may be used to operate the aircraft actuation system of FIG. 4A.

A hydraulic system for the aircraft actuation system 300 is illustrated in FIG. 8 and is identified by reference numeral 400. The hydraulic system 400 includes a pressurized reservoir 402 (e.g., 50-100 psi), a pump, 406, a directional control valve 408, and a relief valve 416. The reservoir 402 is fluidly connected with the directional control valve 408 by an outlet line 404 located at the outlet of the pump 406. A fluid line 410a extends between the directional control valve 408 and the cylinder 322a of the aircraft actuation system 300 (to accommodate flow from the directional control valve 408 (received from the pump 406 via the outlet line 404) to the cylinder 322a, and vice versa). Similarly, a fluid line 410b extends between the directional control valve 408 and the cylinder 322b of the aircraft actuation system 300 (to accommodate flow from the directional control valve 408 (received from the pump 406 via the outlet line 404) to the cylinder 322b, and vice versa). A return line 412 extends between the directional control valve 408 and the reservoir 402. A bypass line 414 extends between the outlet line 404 and the return line 412. The outlet line 404 incorporates the pump 406, while the bypass line 414 incorporates the relief valve 416. The hydraulic system 400 may be used to control the flow of hydraulic fluid into and out of the cylinders 322a, 322b for the operation of the aircraft actuation system 300 in the above-noted manner.

There are a number of benefits regarding the above-noted configuration of the aircraft actuation system 300. One is the potential reduced footprint of the aircraft actuation system 300—the aircraft actuation system 300 may be of a length that is about only 60% of a length of a traditional rack that moves linearly to rotate a pinion for at least certain aircraft applications. The ability to have the cylinders 322a, 322b disposed in different non-colinear orientations may provide flexibility for at least certain installation configurations (e.g., in accord with the aircraft actuation system 270b of FIG. 3B).

Having conformal contact between each roller 350 and each associated shoe 370 (via the curved surfaces 372 of the shoes 370 being complementary-shaped to the outer perimeter of the central body 360 of the rollers 350), in accordance with the foregoing, greatly reduces contact stress between these structures. Multiple rollers 350 being in contact with the pinion 302 at all times reduces contact stress between these components, including when a large portion of the load may be reacted by contact between one roller 450 and the pinion 302 at a given point in time. Having conformal contact between each roller 350 and the pinion 302 (when a given roller 350 is disposed within a complementary-shaped pocket 308 on the outer perimeter 306 of the pinion 302), in accordance with the foregoing, greatly reduces contact stress between these structures.

Figure 9:
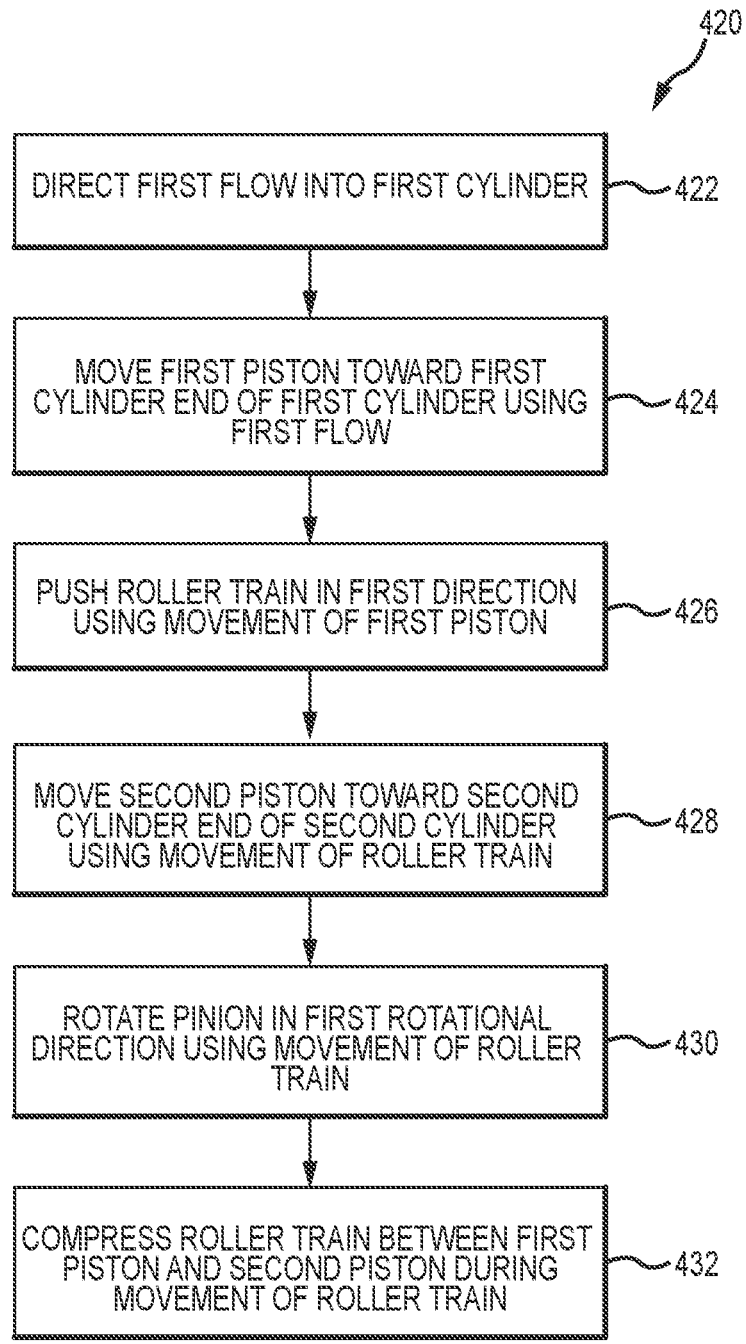
FIG. 9 illustrates a protocol for operating an aircraft actuation system.

A protocol (e.g., a method) for operating an aircraft actuation system in accordance with the foregoing is illustrated in FIG. 9 and is identified by reference numeral 420. The aircraft actuation system includes a first cylinder and a second cylinder. The protocol 420 includes directing a first flow into the first cylinder (422). A first piston of the aircraft actuation system is disposed within the first cylinder and is moved by the first flow toward a first cylinder end of the first cylinder (424). The movement of the first piston (424) pushes a roller train in a first direction (426). This roller train extends between the first and second cylinders and may be engaged with a pinion of the aircraft actuation system throughout movement of the roller train. A second piston of the aircraft actuation system is disposed within the second cylinder and is moved by toward a second cylinder end of the second cylinder by the movement of the roller train in the first direction (428). A pinion of the aircraft actuation system is rotated in a first rotational direction using the movement of the roller train in the first direction (430). Rotation of the pinion may be used to actuate an aircraft component, as discussed above. In any case, the roller train is compressed between the first piston and the second piston based upon the pushing of the roller train in the first direction (426) and having pressurized fluid within the second cylinder between the second piston and the second cylinder end of the second cylinder (432). For instance, this pressurized fluid within the second cylinder may oppose the movement of the second piston toward the second cylinder end of the second cylinder (428).

Any feature of any other various aspects addressed in this disclosure that is intended to be limited to a "singular" context or the like will be clearly set forth herein by terms such as "only," "single," "limited to," or the like. Merely introducing a feature in accordance with commonly accepted antecedent basis practice does not limit the corresponding feature to the singular. Moreover, any failure to use phrases such as "at least one" also does not limit the corresponding feature to the singular. Use of the phrase "at least substantially," "at least generally," or the like in relation to a particular feature encompasses the corresponding characteristic and insubstantial variations thereof (e.g., indicating that a surface is at least substantially or at least generally flat encompasses the surface actually being flat and insubstantial variations thereof). Finally, a reference of a feature in conjunction with the phrase "in one embodiment" does not limit the use of the feature to a single embodiment.

The foregoing description has been presented for purposes of illustration and description. Furthermore, the description is not intended to limit the invention to the form disclosed herein. Consequently, variations and modifications commensurate with the above teachings, and skill and knowledge of the relevant art, are within the scope of the present disclosure. Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. An aircraft actuation system comprising:
   a pinion;
   a first cylinder;
   a first piston movably disposed within said first cylinder;
   a second cylinder disposed in non-collinear relation with said first cylinder;
   a second piston movably disposed within said second cylinder;
   a transfer member interconnected with each of said first piston and said second piston, wherein at least part of said transfer member is disposed out of each of said first and second cylinders and is engaged with said pinion; and
   an outer race extending from a first end of said first cylinder, around a portion of said pinion and spaced from said pinion, and to a first end of said second cylinder,
   wherein movement of said first piston and said second piston within said first cylinder and said second cylinder, respectively, moves said transfer member to rotate said pinion.

2. The aircraft actuation system of claim 1, wherein said first cylinder is parallel with said second cylinder, wherein a reference axis located between said first cylinder and said second cylinder defines a longitudinal dimension for said aircraft actuation system, wherein said first cylinder and said second cylinder are disposed at a common position in said longitudinal dimension.

3. The aircraft actuation system of claim 1, wherein a reference axis located between said first cylinder and said second cylinder defines a longitudinal dimension for said aircraft actuation system, wherein at least one of said first cylinder and said second cylinder is disposed at an angle relative to said reference axis, and wherein an included angle between said first cylinder and said second cylinder is less than 1800.

4. The aircraft actuation system of claim 1, wherein said transfer member is retained in compression between said first piston and said second piston.

5. The aircraft actuation system of claim 1, wherein said transfer member comprises a plurality of rollers and a plurality of shoes, wherein each roller of said plurality of rollers is disposed in spaced relation to every other said roller of said plurality of rollers, wherein each shoe of said plurality of shoes is disposed in spaced relation to every other said shoe of said plurality of shoes, and wherein a different single said shoe is disposed between each adjacent pair of said rollers of said plurality of rollers.

6. The aircraft actuation system of claim 5, wherein each said roller of said plurality of rollers comprises a central body, wherein said central body of each said roller of said plurality of rollers is engaged with an at least generally complementary-shaped curved surface of each said shoe that is engaged with said roller.

7. The aircraft actuation system of claim 6, wherein said central body of each said roller of said plurality of rollers is engageable with an at least generally complementary-shaped pocket on an outer perimeter of said pinion.

8. The aircraft actuation system of claim 6, wherein each said roller of said plurality of rollers comprises a pair of heads disposed at opposite ends of said central body, wherein each head of said pair of heads has a larger outer diameter than an outer diameter of its corresponding said central body, wherein each said head of each said roller comprises a flat end surface and a curved transition surface defined by a radius that is slightly less than a radius of an inner surface of each of said first cylinder and said second cylinder, and wherein contact between each said head of each said roller of said plurality of rollers and said inner surface of each of said first cylinder and said second cylinder is limited to said curved transition surface.

9. The aircraft actuation system of claim 1, further comprising:
   a guide disposed at least generally at said first end of each of said first cylinder and said second cylinder, disposed within an open end of said outer race and spaced inwardly of said outer race, and disposed between said pinion and each of said first cylinder and said second cylinder;

wherein said guide maintains an orientation of each said roller of said plurality of rollers prior to entering a space between said outer race and said pinion.

10. A method of operating an aircraft actuation system comprising a first cylinder and a second cylinder, wherein each of said first cylinder and said second cylinder has a first cylinder end and an oppositely disposed second cylinder end, said method comprising:
   directing a first flow into said first cylinder;
   moving a first piston within said first cylinder toward said first cylinder end of said first cylinder in response to said directing a first flow step;
   pushing a roller train in a first direction in response to said moving a first piston step by said first flow, wherein said roller train extends between said first and second cylinders and is engaged with a pinion of said aircraft actuation system throughout said pushing a roller train in a first direction step;
   moving a second piston within said second cylinder toward said second cylinder end of said second cylinder in response to said pushing a roller train in a first direction step and against a pressurized fluid within said second cylinder between said second piston and said second cylinder end of said second cylinder;
   rotating said pinion in a first rotational direction using said pushing a roller train in a first direction step; and
   compressing said roller train between said first piston and said second piston using each of said pushing a roller train in a first direction step and said pressurized fluid within second cylinder.

11. The method of claim 10, wherein said compressing said roller train step comprises compressing a plurality of rollers and a plurality of shoes between said first piston and said second piston.

12. The method of claim 11, wherein each roller of said plurality of rollers is disposed in spaced relation to every other said roller of said plurality of rollers, wherein each shoe of said plurality of shoes is disposed in spaced relation to every other said shoe of said plurality of shoes, and wherein a different single said shoe is disposed between each adjacent pair of said rollers of said plurality of rollers.

13. The method of claim 12, wherein contact between a first roller of said plurality of rollers and each of a first shoe and a second shoe of said plurality of shoes is maintained by said compressing said roller train step.

14. The method of claim 10, wherein said roller train extends into each of said first cylinder and said second cylinder, said method further comprising:
   precluding said roller train from buckling within said first cylinder; and
   precluding said roller train from buckling within said second cylinder.

15. The method of claim 10, wherein said aircraft actuation system further comprises an outer race, said method further comprising:
   precluding said roller train from buckling upon exiting said first cylinder through its said first cylinder end and prior to entering a space between said outer race and said pinion.

16. The method of claim 15, further comprising:
   precluding said roller train from buckling upon exiting said space between said outer race and said pinion and prior to entering said second cylinder through its said first cylinder end.

17. The method of claim 10, further comprising:
   directing a second flow into said second cylinder;
   moving said second piston within said second cylinder and toward said first cylinder end of said second cylinder in response to said directing a second flow step;
   pushing said roller train in a second direction in response to said moving said second piston step by said second flow, wherein said roller train is engaged with said pinion throughout said pushing said roller train in a second direction step;
   moving said first piston within said first cylinder toward said second cylinder end of said first cylinder in response to said pushing said roller train in a second direction step and against a pressurized fluid within said first cylinder between said first piston and said second cylinder end of said first cylinder;
   rotating said pinion in a second rotational direction using said pushing said roller train in a second direction step; and
   compressing said roller train between said first piston and said second piston using each of said pushing said roller train in a second direction step and said pressurized fluid within first cylinder.

18. The method of claim 17, further comprising:
   providing a first actuation of an aircraft component in response to said rotating said pinion in a first rotational direction step; and
   providing a second actuation of said aircraft component in response to said rotating said pinion in a second rotational direction step, wherein a result of said first actuation is different than a result of from said second actuation.

19. The method of any of claim 10, further comprising:
   providing a first actuation of an aircraft component in response to said rotating said pinion in a first rotational direction step.

* * * * *